United States Patent
Catrein et al.

(10) Patent No.: US 8,769,300 B2
(45) Date of Patent: Jul. 1, 2014

(54) TECHNIQUE FOR CONTENT MANAGEMENT USING GROUP RIGHTS

(75) Inventors: Daniel Catrein, Herzogenrath (DE); Frank Hartung, Herzogenrath (DE); Johannes Willig, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 13/119,279

(22) PCT Filed: Sep. 18, 2008

(86) PCT No.: PCT/EP2008/007822
§ 371 (c)(1),
(2), (4) Date: Apr. 7, 2011

(87) PCT Pub. No.: WO2010/031413
PCT Pub. Date: Mar. 25, 2010

(65) Prior Publication Data
US 2011/0179288 A1    Jul. 21, 2011

(51) Int. Cl.
*G06F 21/00* (2013.01)

(52) U.S. Cl.
USPC ............ 713/189; 713/153; 713/168; 713/190

(58) Field of Classification Search
USPC ........................................................ 713/189
See application file for complete search history.

(56) References Cited

U.S. PATENT DOCUMENTS

| | | | | |
|---|---|---|---|---|
| 2002/0180782 A1* | 12/2002 | Natsuno | ......................... | 345/743 |
| 2004/0117309 A1* | 6/2004 | Inoue et al. | ....................... | 705/50 |
| 2005/0041679 A1* | 2/2005 | Weinstein et al. | ............ | 370/432 |
| 2006/0129496 A1* | 6/2006 | Chow et al. | ....................... | 705/59 |
| 2006/0212399 A1* | 9/2006 | Akiyama | ......................... | 705/50 |
| 2007/0074250 A1* | 3/2007 | Furukawa | ........................ | 725/40 |
| 2007/0124313 A1* | 5/2007 | Kim et al. | ......................... | 707/10 |
| 2007/0204182 A1* | 8/2007 | Moriai | ......................... | 713/320 |
| 2008/0091608 A1* | 4/2008 | Liao et al. | ........................ | 705/51 |
| 2008/0222658 A1* | 9/2008 | Allen et al. | ................... | 719/320 |
| 2008/0313745 A1* | 12/2008 | Lim et al. | ......................... | 726/28 |
| 2009/0125987 A1* | 5/2009 | Irwin | ................................ | 726/4 |

OTHER PUBLICATIONS

"An Efficient Right-granting Model with Hierarchical Group Rights for Large-scale Content Distribution", 2006.*
http://xml.coverpages.org/OMADRM-DCFv202-20040420.pdf.*
Open Mobile Alliance Ltd, "DRM Content Format V2.0,", in Apr. 2004.*
Zhang et al.: "An Efficient Right-granting Model with Hierarchical Group Rights for Large-Scale Content Distribution,", in 2006.*
Open Mobile Alliance. "DRM Content Format V2.0." Draft Version 2.0, OMA-DRM-DCF-V2_0-200400420-D, Apr. 20, 2004.

* cited by examiner

*Primary Examiner* — Kambiz Znad
*Assistant Examiner* — Yonas Bayou
(74) *Attorney, Agent, or Firm* — Coats & Bennett, PLLC

(57) ABSTRACT

A technique for content management using group rights is described. The technique facilitates a flexible management for a group of content files mainly by effecting a change of group memberships for subsets of the group and a partial update of the content files. As one aspect, a content file manager (20) is provided to create content files associated with group rights. A device (21) is also provided to process such content files. One method aspect comprises assigning a plurality of content items to a new group whose identifier is associated with a new group rights object; determining if any of the content items has been previously distributed; and for each previously-distributed content item, creating an update content file including the group identifier of the new group and excluding the previously-distributed content item itself.

23 Claims, 6 Drawing Sheets

TECHNIQUE FOR CONTENT MANAGEMENT USING GROUP RIGHTS

TECHNICAL FIELD

The present invention generally relates to content management. Specifically, the invention relates to a technique for managing content using group rights objects.

BACKGROUND

Digital Rights Management (DRM) is a set of technologies that provide the means to control the distribution and consumption of content (sometimes also termed as media, content object, content/media items, content/media objects, content/media elements, and the like). Under the DRM framework, content is securely distributed and consumed by authorized recipients, e.g. authenticated user devices, per the usage rights expressed by the content issuer (other names for content issuer include content provider, content owner, content distributor, and the like). The DRM framework is independent of content formats, operating systems, communication channels, and runtime environments. Content protected by the DRM can be of a wide variety: documents, images, ring tones, music clips, video clips, streaming media, games, and so on.

A known DRM system is standardized in the Open Mobile Alliance (OMA) technical specification "DRM Version 2.0". The OMA DRM system enables content issuers (CI) to distribute protected content and rights issuers (RI) to assign rights associated with the protected content. Rights are also known as usage rights, (usage) permissions, (usage) rules, (usage) constraints, and so forth. They govern the manner the protected content is consumed by particular content recipients. For user consumption of the content, the content recipient acquires the respective rights from the RI. The content is cryptographically protected when distributed; thus the protected content can only be used with the associated rights issued for the specific content recipient and appropriate decryption key(s).

According to OMA DRM Version 2.0, the protected content and the associated rights may be delivered to the content recipient separately. Public key infrastructure (PKI) concepts may also be applied, at least to a certain degree, for improved security. The basic idea of OMA DRM Separate Delivery is illustrated in FIG. 1A.

As shown in FIG. 1A, a content item 1 as provided by CI 2 is encrypted (as figuratively shown by the lock 4). The encryption is performed with a Content Encryption Key (CEK) (not shown). The encrypted content item 1 is embedded into a so-called "content file" 3 to be distributed to a content recipient 5. At the same time, an RI 6 issues certain rights 7 for the content recipient 5. The rights 7 may be encoded into a data structure called Rights Object (RO) 8. The RO 8 also comprises a cryptographic key 9 which corresponds to the CEK with which the content item 1 has been encrypted. Moreover, the entire RO 8 may be protected (as figuratively shown by the lock 10) by encryption with another key (not shown), e.g., a public key of the content recipient 5.

The content file 3 and the (encrypted) RO 8 are delivered to the content recipient 5 separately, e.g. via separate channels or routes 11 and 12. Using a private key 13, the content recipient 5 decrypts the RO 8 so that it can retrieve the CEK 9 and the granted rights 7 embedded in the RO 8. With knowledge of the CEK 9 and the rights 7, the content recipient 5 is then able to decrypt the protected content item 1 received via the content file 3 and consequently, the content item 1 can be consumed according to the rights 7.

Group Rights Objects (GROs) have been introduced in the OMA DRM system in order to govern the consumption of multiple content items by a single rights object. Under a GRO, several content files can be grouped together, which has the effect that the content items comprised therein form a group. Once the rights granted in a GRO expire, a new GRO may be issued by a RI. The rights granted in this new GRO are valid for all the content items in the group. The basic structure of a GRO and its association with a group of content items is depicted in FIG. 2.

As shown in FIG. 2, a GRO is identified by a group identifier, or GID. Each content file belonging to the GRO is marked with the same GID. Thus, through the common GID the group of content files are associated with the GRO. The GRO is a single rights object issued (by an RI) for all the content items in the respective group. Hence, the consumption of all these content items can be governed by the same rights. The GRO also comprises a Group Key, or Group Encryption Key (GEK), that is used to encrypt the CEKs of all the content files. This will become more apparent below.

With DRM, an encrypted content item may be packaged into a content file of a specific format, the DRM Content Format. In the present context, such a content file is referred to as a DCF file. The DCF file may be object-structured. An example of the DCF file format is specified in OMA's "DRM Content Format Version 2.0". This format is based on ISO Base Media File Format specification ISO14496-12 and hence is constructed around an object-oriented design of "boxes". Section 6.3 of OMA DRM DCF Version 2.0 presents an overall structure of this particular format, and the relevant components thereof are now explained with reference to FIG. 3.

As shown in FIG. 3, a DCF file 30 includes one or more "DRM Container" boxes 31 and 32. Each DRM Container box 31 has a content item 33 and its associated headers, which are comprised in the "DRM Content" box 34 and the "DCF Headers" box 35, respectively. One of the headers in the DCF Headers box 35 is "Content ID" 36, which uniquely identifies the content item 33. There may be other headers within the DCF Headers box 35. One or more of these other headers may include zero or more nested boxes that add functionalities to the DCF headers.

Corresponding to the GRO concept, the DCF file may include a DRM GroupID box 37 in the DCF Headers box 35. The DRM GroupID box 37 may further include a GroupID field 38 for identifying the DCF file 30 in question as part of a group of DCF files whose rights are defined in a common GRO instead of (or in addition to) in separate content-specific ROs. This GroupID field 38 includes the above-mentioned GID of the group of content files, which corresponds to the GID of the GRO. Hence, the GID in the GroupID field 38 in the DCF file 30 may serve as a reference to the associated GRO.

The DCF Headers box 35 may also include a "GroupKey" box 39 for comprising an encrypted key. Generally, each content item of a group of content files will be encrypted with a different CEK (CEK1, CEK2, as so on) as shown in FIG. 2. To further protect these CEKs, an additional key (used for the whole group) may be employed; this is the function of the Group Encryption Key, or GEK, comprised in the GRO. The GEK is used to encrypt all the CEKs used for protecting the respective content items in the DCF file group (see FIG. 2). The encrypted CEKs are stored in the GroupKey boxes 39 of the respective DCF files.

A GRO is particularly useful for broadcasting (the same) content to multiple recipients, so that the content can be protected by the same group key and the same rights can be granted to each content recipient in the group. To consume the content, each individual recipient needs to acquire the GRO one way or the other. This may be done via a unicast connection, using the Rights Object Acquisition Protocol (ROAP) specified by OMA, for example.

The DRM systems known in the art, including the OMA DRM are inferior in that they fail to provide a flexible management of content files using GROs.

SUMMARY

Accordingly, there is a need for a technique to manage content files governed by common group rights in a more flexible manner.

According to a first aspect, a method of creating content files for content items is provided. The content items are for use by one or more content recipients. The method comprises assigning, to a new group, a plurality of content items that are to be distributed, wherein a group identifier of the new group is associated with a new group rights object; determining if any content item in the new group has been previously distributed; for each previously-distributed content item, creating an update content file which includes the group identifier of the new group but excludes, or leaves out, the content item itself which has been previously-distributed, and outputting at least each update content file.

The technique described herein is not limited to the OMA specifications. The content file may be of the DCF file format specified in the related OMA documents, but this is not mandatory; any suitable content file format is possible. Similarly, the group rights may be packaged in a group rights object, such as the OMA's GRO structure as defined in the related OMA specifications, but they are not restricted to the OMA's definition in terms of format, function, purpose, and so on; instead, the technique can be practiced with any group rights object defining one or more rights intended for a group of content recipients.

As an additional feature, if it is determined that a certain content item has not been previously distributed, a new content file may be created for each such content item. The new content file includes the group identifier of the new group and the content item itself (which has not been previously distributed). The new content file may then be output as well.

The method may further comprise generating certain control information which serves to instruct the content recipient to modify, or update, the content file previously received by the content recipient. Also, a link, or cross-reference, can be established between the control information and the respective updated content file. In other words, the generated control information may be associated with the respective update content file. For instance, the control information may be inserted into or attached or appended to the respective update content file so that the control information is distributed together with the update content file. Alternatively, the control information and the content file can be separately distributed as long as there exists a certain association between the two to enable the content recipient to correctly determine which control information refers to which update content file or vice versa.

Content files may be identified by identifiers. Specifically, the control information for each update content file may comprise one or more of the following: an identifier of the update content file, an identifier of the previously-distributed content file (which was created for the respective previously-distributed content item), a hash value for verifying the content file update, (additional) header information related to digital rights management, and one or more modification instructions.

The modification instruction can, among others, indicate which of the data box(es)/data field(s) in a content file needs modifying. The indication may be done through specifying the position(s) of the box(es)/field(s). The position(s) may be indicated in a "relative" manner, which means that the indicated position is not necessarily absolute in the sense that "byte x of file" has to be changed. Instead the position may be specified as n-th field in the m-th box, for example.

In order to protect the content items to be distributed, the method may further comprise providing, for each content item that has not been previously distributed, a cryptographic key for encrypting the content item. This key may be termed as content encryption key (CEK), but it is not limited to the variants or purposes of the CEK defined in the related OMA specifications. The CEK may also be "re-distributed" for a content item that has already been distributed, i.e., an update content file comprises the same content key encrypted with a new group key. Once provided, the CEK may be stored in a data storage. Conversely, with respect to each content item that has been previously distributed and for which an update content file is to be created, the method may further comprise retrieving the respective CEK from the data storage and including the retrieved CEK in the respective update content file. The providing and storing procedure of the CEK is independent from the retrieving and including procedure; the two procedures may thus be performed in an "and/or" fashion.

The CEKs may be provided in different ways. They can be generated by an apparatus that performs the method described herein, or they can be obtained from an external source, e.g. an RI. Usually, in DRM systems, it is the RI that generates cryptographic keys. However, the keys may also be generated by the CI and signalled to the RI and/or the apparatus executing the method. Equivalently, the keys may also be generated by the apparatus itself.

As an enhanced security measure, at least part of the update content file may be digitally signed. Particularly, the group identifier of the new group in the update content file may be digitally signed, so as to, inter alia, prove to the content recipient the trustable origins of the updates. The digital signing may be performed by an entity for issuing rights, such as the RI.

Further, a time stamp indicating when the update content file is created may be included in the update content file. This is beneficial in that the content recipient can be signalled which update content file is the most recent update. This is useful especially in case an update message is e.g. delayed or missed. As an alternative to the time stamp, one could use a sequence number from which the content recipient may be able to determine the most recent update.

As a further security measure, the group rights object may be associated with a group encryption key (GEK) (which has the same name as but is not limited to the GEK defined in the related OMA specifications) for protecting the CEKs which in turn protect the group of content items. The association could be done by embedding the GEK in the group rights object. The GEK can encrypt the CEKs which are used for protecting the group of content items. After encryption, the encrypted CEKs may be included in the updated/new content files.

The method may further comprise registering a content item that has not been previously distributed and/or registering the content update for a content item that has been. Both registration may be performed by the RI. For example, for a content item that has not been previously distributed, at the initial distribution before any update, the RI may generate and register the CEKs and the GEKs and also generate a new GroupID. With respect to registering content update, only new GEKs and new GroupID may need to be re-generated which CEKs may remain the same.

According to a second aspect, a method to process content files created for content items is provided. The method comprises receiving at least one content file; determining if the content file is an update content file created for a content item previously provided to the content recipient via a previously-received content file, wherein the update content file comprises a group identifier of a new group associated with a new group rights object and excludes the content item previously provided; and, in response to a result of the determination, modifying the previously received content file for a continued use by the content recipient.

The modification of the previously received content file may include one or more aspects. The group identifier of the previously-received content file may be replaced with the new group identifier comprised in the update content file. As an alternative, the new group identifier comprised in the update content file may be added to the previously-received content file. When a new group identifier is "added", the previously-received content file is modified to comprise two (or more) group identifiers: the group identifier(s) already comprised in the previously-received content file, and the new group identifier from the update content file. Having two or more group identifiers in the content file gives the content recipient various novel possibilities, including the possibility of being able to access the content via different rights objects. Such different rights objects may, for example, include the rights object associated with the (at least one) old group identifier, and the one associated with the new group identifier.

In case the update content file further comprises control information regarding the modification of the previously-received content file, the modification may further be carried out based on that control information. Specifically, the control information in the update content file may comprise one or more of the following: an identifier of the update content file, an identifier of the previously-distributed content file, a hash value for verifying the content file update, (additional) header information related to digital rights management, and one or more modification instructions.

The modification of the content file may involve numerous steps and specifics. Upon receipt of an update content file, the content recipient may check if any further rights object has ever been acquired for the corresponding previously-received content file. If it is found that the content recipient has previously acquired one or more further rights objects for the previously-received content file, a copy of the previously-received content file may be created. While one copy may remain intact, the other copy may go through the modification procedure. Thus, the duplication avoids breaking any previously-acquired rights object.

Further, for a better storage management such as storage conservation, the previously-received content file may be deleted, or a deletion at a future point of time may be scheduled. Alternatively, the previously-received content file may be marked for an optional deletion.

Especially if the received content file is not an update content file, the method may further register this "new" content file. If it is an update content file, the method may update the registration of the corresponding previously-received content file. The registration of the new content file and the update of registration may be performed in an "and/or" fashion. With respect to the registration, it comprises registering an identifier of the content item included in the received content file and a storage location of the received content file. Regarding the update of registration, certain DRM related information may be updated: When a content file is updated, DRM related information such as content ID, GRO ID, and/or other meta information, e.g., file name, may change. If such information is stored in a database of a device, e.g., in a database comprising references between ROs and DCFs, the information may need to be updated.

Further, the method may comprise obtaining the new group rights object referred to by the group identifier of the new group. The new group rights object may be obtained by the content recipient either directly after the receipt of the content file or when a user (using the content recipient) decides to consume the content of any of the content items of the new group. Alternatively, the new group rights object, like any RO in general, may be pushed to the content recipient by the RI; thus, the new groups rights object may also be transmitted before the receipt of the content file or together with the content file. In general, the timing of the reception of the new group rights object can be at any time. The new group rights object may be received before, after, or at the time of sending the content. However, in whichever case, it should be made available to the content recipient in time for content consumption.

In general, the technique can be practiced by means of hardware, software, or a combined hardware/software approach. As regards a software approach, a computer program product is provided comprising program code portions for performing the steps of the method described herein when the computer program product is executed on a computer system or a computing device. The computer program product may be stored on a computer-readable recording medium.

According to a hardware realization, an apparatus, conveniently termed as "content file manager", is provided. The content file manager is adapted to create content files for content items to be used by one or more content recipients. The content files are grouped by means of a group identifier associated with a group rights object. The content file manager comprises a first component adapted to assign, to a new group, a plurality of content items that are to be distributed, wherein a group identifier of the new group is associated with a new group rights object; a second component adapted to determine if any of the content items of the new group has been previously distributed; a content file creator adapted to create an update content file for each previously-distributed content item, the update content file including the group identifier of the new group and excluding the previously-distributed content item itself; and an output adapted to output at least each update content file.

The content file creator may further be adapted to create a new content file for each content item that has not been previously distributed. The new content file includes, among others, the group identifier of the new group and the content item itself (which has not been previously distributed). Accordingly, the output may be further adapted to output the new content file.

For each content item which has been previously distributed, the content file manager may generate control information related to the modification of the corresponding content file previously received by the content recipient. The content manager may further associate the control information with the respective update content file. For instance, the control information may be inserted into or attached or appended to the respective update content file so that the control information is distributed together with the update content file. Alternatively, they can be separately distributed as long as there exists a certain reference between the two to enable the content recipient to correctly determine which control information refers to which update content file or vice versa.

As a further hardware aspect, a device adapted to process content files created for content items is provided. The content files may be grouped by means of a group identifier associated with a group rights object. The device comprises an input adapted to receive at least one content file. The device further comprises a determinator adapted to determinate whether the received content file is an "updated" content file created for a content item previously provided to the device via a previously-received content file, wherein the update content file comprises a group identifier of a new group associated with a new group rights object and excludes the content item previously provided. The device further comprises a modifier adapted to, in response to a result of the determination, modify the previously-received content file so that it may be continuously used by the device.

Specifically, the modifier can modify the previously-received content file by replacing the group identifier comprised therein with the new group identifier comprised in the update content file, or adding to it the previously-received content file the new group identifier comprised in the update content file.

The update content file may further comprise certain control information regarding the modification of the previously-received content file. Accordingly, the modifier may be further adapted to carry out the modification based on the control information. Specifically, the control information for the update content file may comprise one or more of the following: an identifier of the update content file, an identifier of the previously-distributed content file, a hash value for verifying the content file update, (additional) header information related to digital rights management, and one or more modification instructions.

In addition, the device may further check if it has previously acquired any further rights object for the previously-received content file. If it has, the device may create a copy of the previously-received content file. Moreover, for the benefit of storage management, the device may choose to carry out the following: delete the previously-received content file, schedule for a deletion thereof at a future point of time, or mark the file an optional deletion thereof.

The device may further register the content file it receives. If the received content file is a "new" content file, i.e. it is not an "updated" version of any previously-distributed content file, the device registers the new content file. This registration may include registering an identifier of the content item included in the received new content file and registering a storage location of the received new content file. On the other hand, if the received content file is an "updated" version, the device may update the registration of the corresponding previously-received content file. The registration of the new content file and the update of registration may be performed in an "and/or" fashion.

The device may also obtain the new group rights object according to the group identifier of the new group. The device may choose to obtain the new group rights object either directly after the receipt of the content file by the device or when a user of the device decides to use (or consume) the content of any of the content items of the new group. Alternatively, the new group rights object, like any RO, may be pushed to the device, e.g. by an RI. In general, the timing of the reception of the new group rights object can be at any time. The new group rights object may be received before, after, or at the time of sending the content. However, in whichever case, it may be made available to the device in time for content consumption.

BRIEF DESCRIPTION OF THE DRAWINGS

In the following, the techniques proposed herein will be described with reference to exemplary embodiments illustrated in the drawings, wherein.

DETAILED DESCRIPTION

Figure 1A:
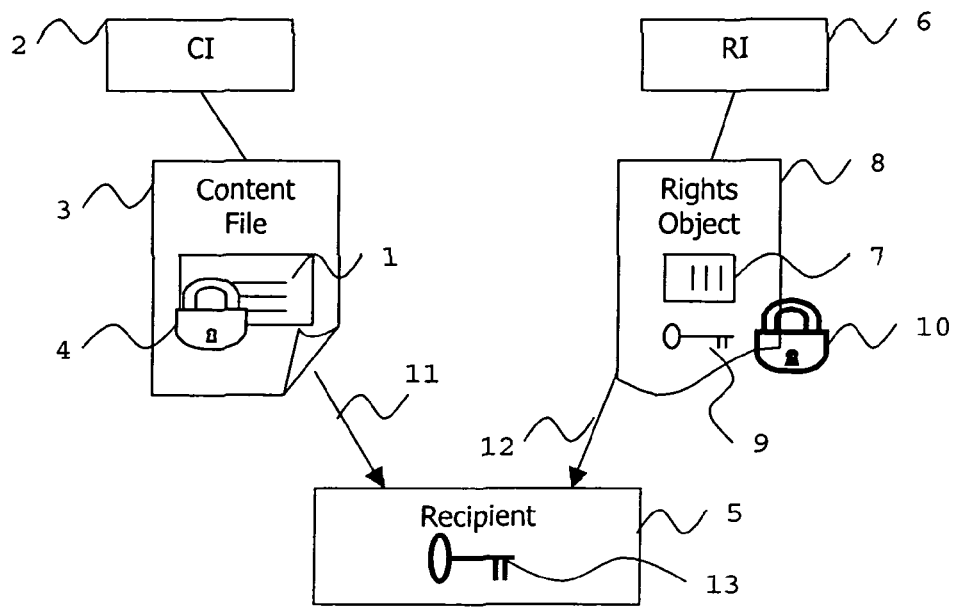
FIG. 1A is a block diagram illustrating the basic concept of DRM separate delivery of content and rights.

In the following description, for purposes of explanation and not limitation, specific details are set forth, such as particular sequences of steps, interfaces and configurations, in order to provide a thorough understanding of the technique. It will be apparent to those skilled in the art that the technique may be practiced in other embodiments that depart from these specifics.

Moreover, those skilled in the art will appreciate that the functions explained herein below may be implemented using software functioning in conjunction with a program microprocessor or a general purpose computer. It will also be appreciated that while the technique is primarily described in the form of methods and devices, the technique may also be embedded in a computer program product as well as in a system comprising a computer processor and a memory coupled to the processor, wherein the memory is encoded with one or more programs that may perform the functions disclosed herein.

The following embodiments will primarily be described with reference to the DRM system and DRM Content Format as specified by the OMA. But such choice is for an easy understanding of the technique only; the technique described herein is not limited to any of the OMA specifications or related definitions or terminologies. Particularly, the content file may be of the DCF file format specified in the related OMA documents, but this is not mandatory; any suitable content file format is possible. Similarly, the group rights may be packaged in a group rights object, such as the OMA GRO structure as defined in the related OMA specifications, but they are not restricted to the OMA definition in terms of format, function, purpose, and so on; instead, the technique can be practiced with any collection of rights intended for consumption by a plurality of content recipients.

It has been found that OMA DRM does not provide any mechanism to update rights for a subset of a group. Furthermore, management of groups is not considered at all in OMA DRM. Rights may only be granted to a whole group. Further, since OMA DRM fails to clearly define which of the content items the recipient(s) might still require and which elements may be deleted, a large amount of protected and distributed content needs to be stored in the recipients.

To address these drawbacks, the following embodiments illustrate aspects of a technique for content management using group rights based on a flexible change of group memberships for one or more subsets of a content-file group. Some aspects enable partial updates of the (already-distributed) content files. Moreover, some aspects provide a secure and efficient storage management by lowering the requirement of storage capacity needed for content items and content files. Consequently, a flexible management for content files is obtained.

The following embodiments involve, among others, an interaction between a content file manager and a content file management client. A more detailed view at a system level can be obtained from the system of FIG. 1B, which illustrates the context in which the embodiments may be practised and possible interfaces of the involved entities.

Figure 1B:
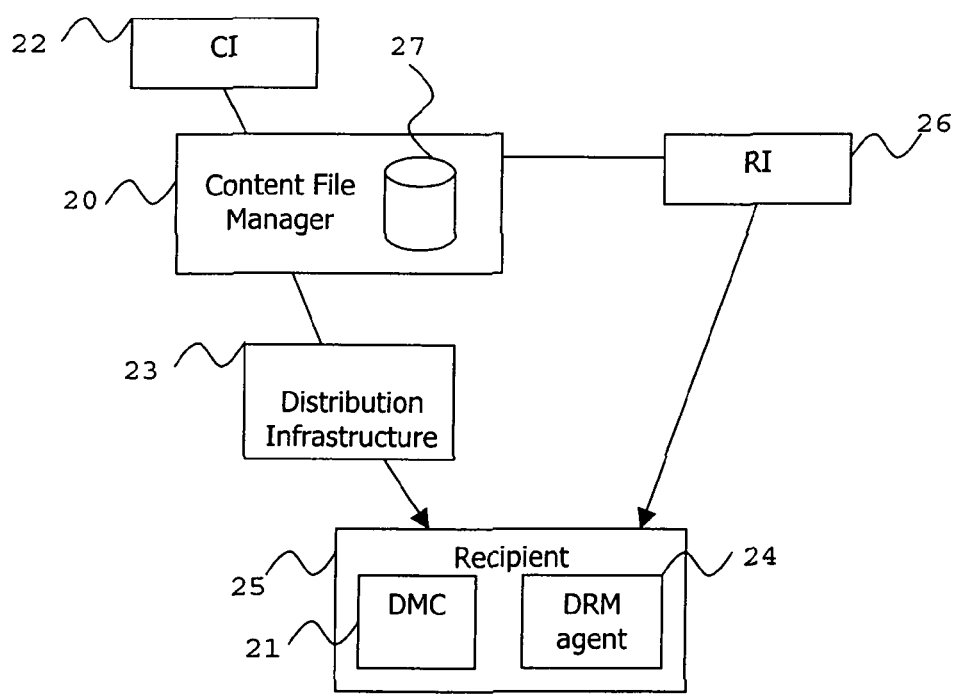
FIG. 1B is a block diagram showing an embodiment of a system architecture.
Figure 2:
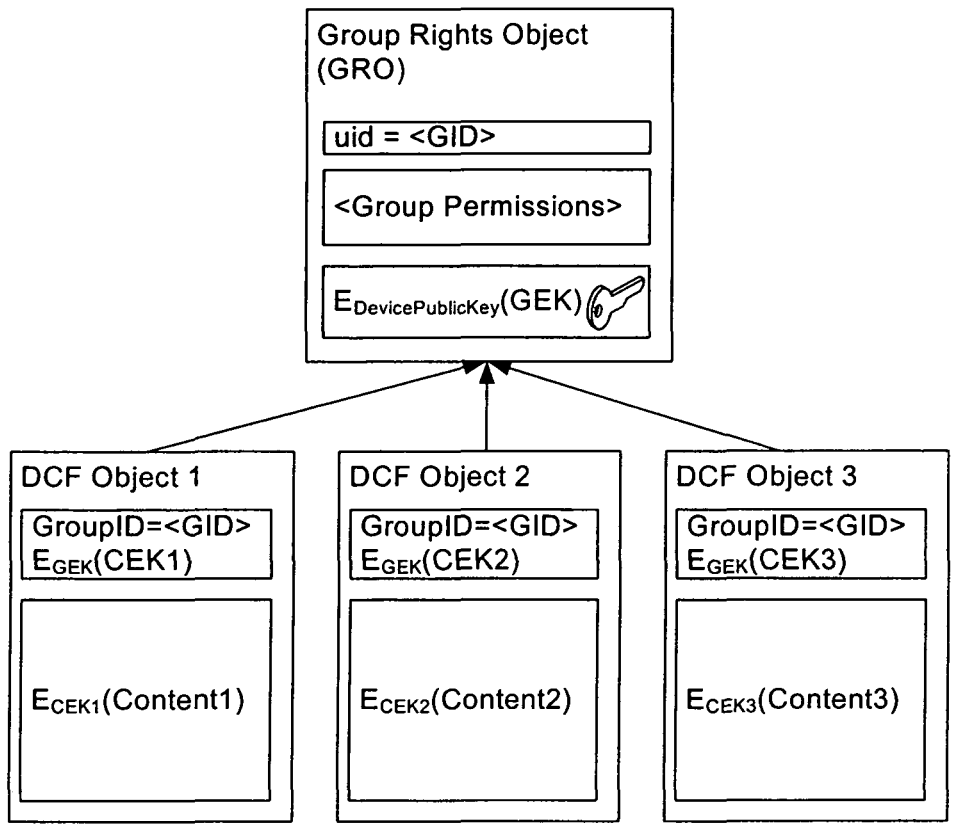
FIG. 2 is a block diagram showing a Group Rights Object and its association with a group of content files according to the DRM system.
Figure 3:
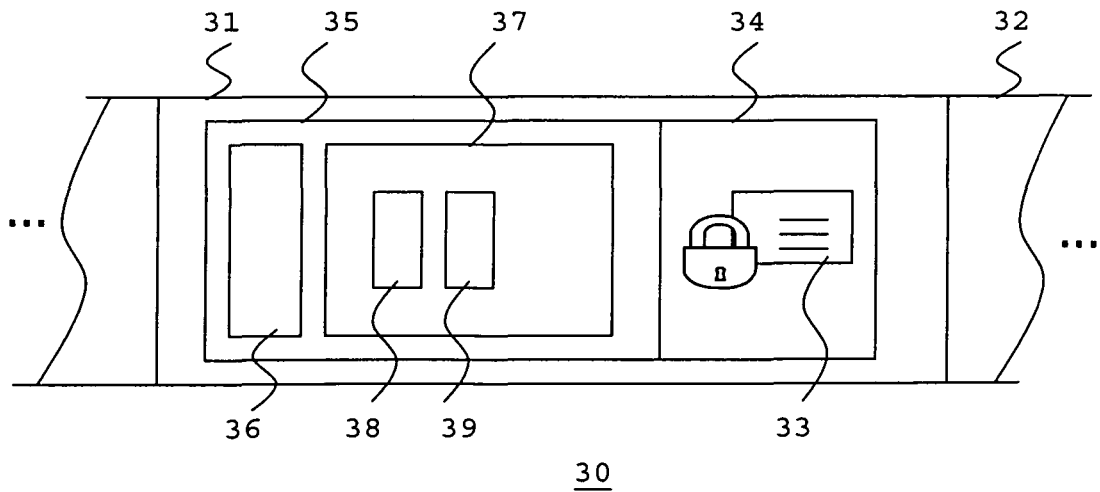
FIG. 3 is a diagram showing the structure and the relevant components of a content file according to the OMA DCF format.

As shown in FIG. 1B, the system comprises a CI 22, an RI 26, a recipient 25, and a distribution infrastructure 23. These entities correspond to the CI 2, RI 6, recipient 5, and the channel/route 11 as shown in FIG. 1A, respectively. Moreover, two additional functional entities are introduced: A content file manager 20, and a "content file management client" 21 (DMC). The recipient 25 further comprises a DRM agent 24 for obtaining GROs, e.g. an OMA DRM 2.0 DRM agent.

The content file manager 20 is responsible for creating content files for content items (originally) provided by the CI 22. The content file manager 20 may be a separate entity, but may also be integrated with the CI 22 and/or the RI 26, or be a part of the distribution infrastructure 23. The created content files are distributed to the DMC 21 via the distribution infrastructure 23. The DMC 21 may reside on the content recipient 25, which receives the content files distributed thereto and acquires the associated rights and/or group rights from the RI 26.

Figure 4:
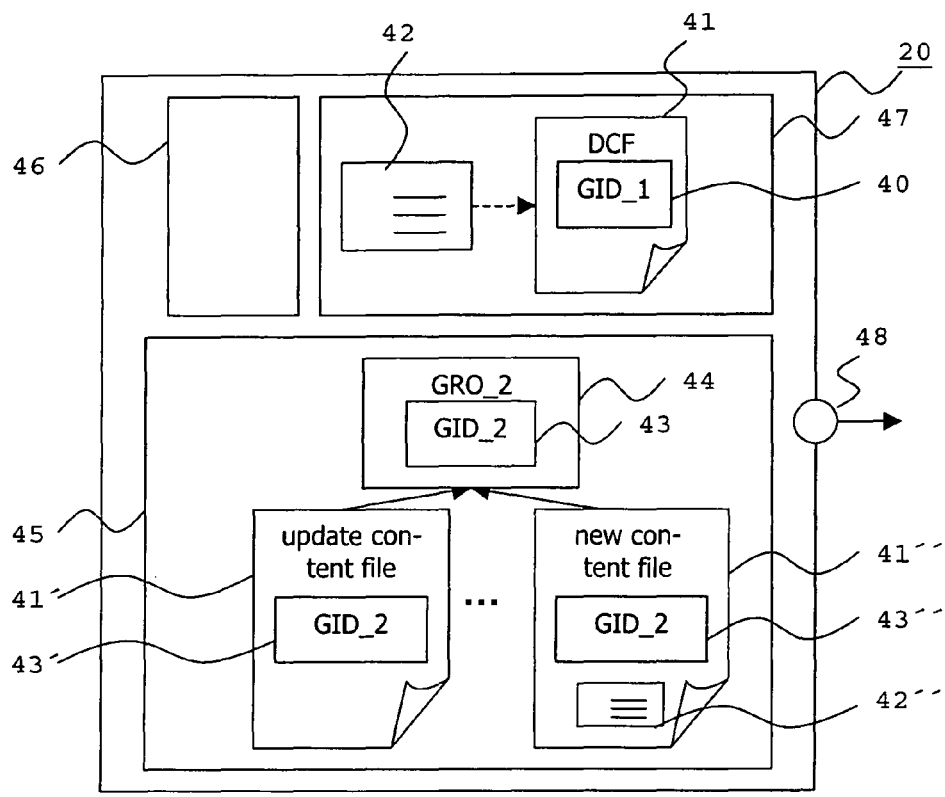
FIG. 4 is a block diagram showing an apparatus embodiment of the technique.

FIG. 4 shows an embodiment of the content file manager 20 of FIG. 1B adapted to create content files 41, 41', 41" for content items 42, 42" to be used by one or more content recipients 25. One content file 41 created by the content file manager 20 belongs to a group identified by GID_1 shown at 40 of FIG. 4. Other content files 41', 41" created by the content file manager 20 are grouped by means of a Group Identifier 43' and 43", "GID_2". Via the GID_2, the group of content files 41', 41" are associated with a Group Rights Object 44, "GRO_2".

The content file manager 20 comprises a first component 45 adapted to assign, to a new group, a plurality of content items 42, 42" that are to be distributed, wherein the Group Identifier GID_2 of the new group is associated with a new Group Rights Object GRO_2 shown at 44. It should be pointed out that the GRO is normally not within the first component 45; the fact that it is shown here is only to illustrate the concept that the group of content files are associated with the GRO via the GID. In this context it is noted that GRO_1 is not shown while GRO_2 is shown.

The content file manager 20 further comprises a second component 46 which is adapted to determine if any of the content items 42, 42" of the new group has been previously distributed. The previously-distributed content item is indicated at 42. Further, the content file manager 20 comprises a content file creator 47 which is adapted to, for each previously-distributed content item 42, create an update content file 41' including the Group Identifier 43' of the new group, GID_2, and excluding the previously-distributed content item 42 itself. Moreover, the content file manager 20 comprises an output 48 adapted to output at least each update content file 41'.

The content file creator 47 is further adapted to create a new content file 41" for each content item 42" that has not been previously distributed'. This new content file 41" includes the Group Identifier 43" of the new group, GID_2, and the content item 42" that has not been previously distributed. The output 48 is further adapted to output the new content file 41".

Figure 5:
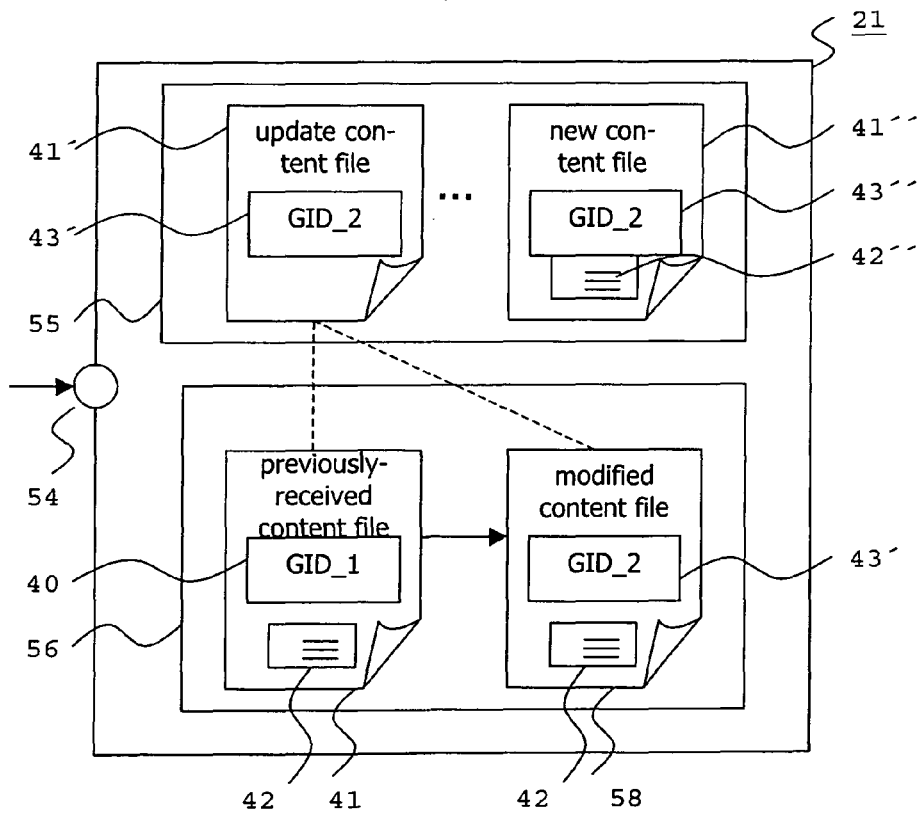
FIG. 5 is a block diagram showing a device embodiment of the technique.

FIG. 5 shows an embodiment of the DMC 21 of FIG. 1B adapted to process the content files 41, 41', 41" created for the content items 42, 42" by the content file manager 20 of FIG. 4. As mentioned above, the content files 41', 41" are grouped by means of the Group Identifier 43', 43", GID_2. Through the GID_2 the content files 41', 41" of the group are associated with a Group Rights Object (not shown in FIG. 5 but shown in FIG. 4 as GRO_2, 44).

The device 21 comprises an input 54 adapted to receive one or more of the content files 41, 41', 41". The device 21 further comprises a determinator 55 adapted to determine if the received content file is an update content file 41' created for a content item 42 provided to the device 21 via a previously-received content file 41. One way of determining this is to verify whether the currently-received content file comprises a group identifier of a new group associated with a new group rights object and excludes the content item 42 provided. Alternatively, the update content file may comprise a reference to the "old" content file, e.g., via the file name, which may also be used to identify that an "old" file should be updated. (The term "new" is in view of the group that the previously-received content file 41 belonged to.)

As shown in FIG. 5, the update content file 41' comprises the Group Identifier 43' of the new group, GID_2, associated with a new Group Rights Object (not shown in FIG. 5 but shown in FIG. 4 as GRO_2, 44) and excludes the content item 42 previously provided. This exclusion can be appreciated from FIG. 5 by comparing the update content file 41' to the previously-received content file 41 which comprises the content item 42.

Further, the device 21 comprises a modifier 56 adapted to, in response to a result of the determination by the determinator 55, modify the previously-received content file 41 for continued use by the device 21. 58 indicates the modified content file. The "continued use by the content recipient" may stand for a use of the previously-received content file or the content item comprised therein but according to the rights expressed in the new Group Rights Object. That is, the device has previously received a content file which comprises the very same content item, and the currently-received content file is an update content file for this previously-received content file with the update content file not including the content item of the previously-received content file. Specifically, the modifier 56 is adapted to modify the previously-received content file 41 by replacing its Group Identifier 40, GID_1, with the new Group Identifier 43', GID_2, comprised in the update content file 41', to use the content item 42. Alternatively, the modifier 56 is adapted to modify the previously-received content file 41 by adding the new Group Identifier 43', GID_2, comprised in the update content file 41' to the previously-received content file 41.

With the above modification, the previously-received content file 41 becomes the modified content file 58. Having two or more GIDs (e.g. GID_1 40 and GID_2 43') in the modified content file 58 gives the advantage that the content recipient is able to access the content 42 via different Group Rights Objects, i.e. either via GRO_1 (not shown) or GRO_2.

Figure 6:
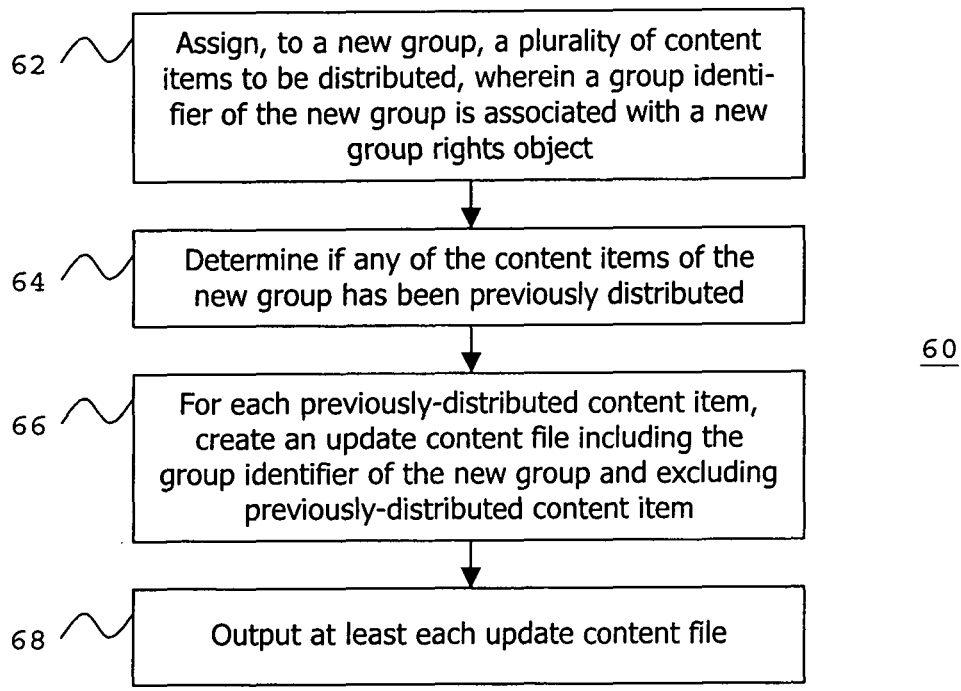
FIG. 6 is a flow chart showing a method embodiment illustrating the operation of the apparatus embodiment of FIG. 4.

FIG. 6 is a flowchart 60 showing an embodiment of a method that may be performed by the content file manager 20 as shown in FIG. 1B and FIG. 4, or by an apparatus having a different configuration.

In a first step, as indicated at 62, a plurality of content items (see FIG. 4, content items 42 and 42") to be distributed are assigned to a new group, wherein a Group Identifier 43' and 43" of the new group, GID_2, is associated with a new Group Rights Object 44, GRO_2. Next, at step 64 of FIG. 6, it is determined whether any of the content items 42, 42" of the new group has been previously distributed. Then, at step 66, for each previously-distributed content item 42, an update content file 41' is created. The update content file 41' includes the group identifier 43' of the new group, GID_2, but excludes the previously-distributed content item 42 itself. Finally, at step 68, at least each update content file 41' is output. The term "new" is used to differentiate from the group or groups to whom any of the plurality of content items might belong to previously. The content files to be created can be aggregated into a group (or even multiple groups). For instance, they are identified by a common group identifier. The group identifier is associated with certain group rights.

Figure 7:
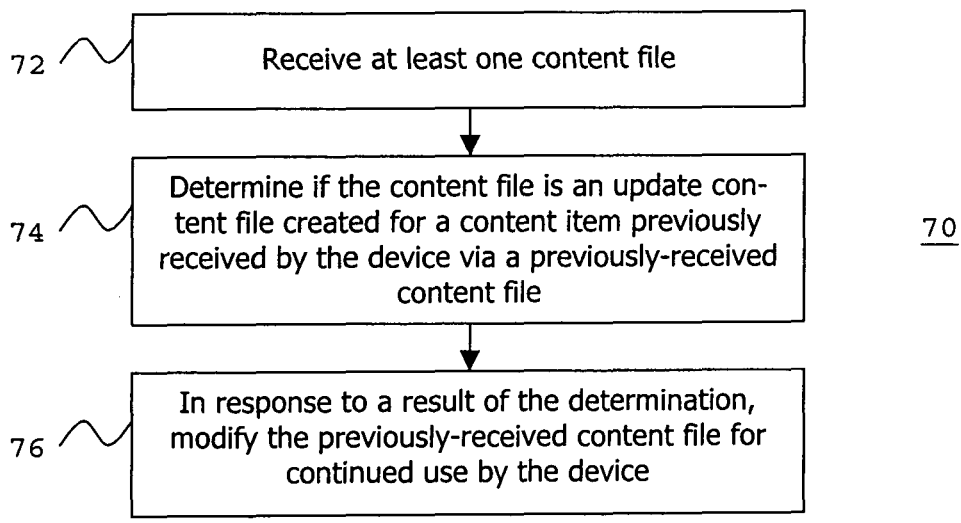
FIG. 7 is a flow chart showing a method embodiment illustrating the operation of the device embodiment of FIG. 5.

FIG. 7 is a flowchart 70 showing an embodiment of a method that may be performed by the device 21 as shown in FIG. 1B and FIG. 5, or another device having a different configuration.

To start with, as shown at step 72, at least one content file 41', 41" is received. Thereafter, it is determined at step 74 whether the content file is an update content file 41' created for a content item 42 provided to the device 21 via a previously-received content file 41. In response to a result of the determination, the previously-received content file 41 is modified, as shown at step 76, for continued use by the device 21.

In the context of both methods as illustrated in flowcharts 60 and 70, the content files may take the DCF file format as specified in the related OMA documents, but this is not mandatory. The group identifier is associated with a group rights object. The group rights object is not limited to the OMA GRO structure.

Now returning to the system embodiment FIG. 1B again, it is pointed out that the technique proposed herein is suitable for all kinds of distribution infrastructure and/or scenarios. These include, but are not limited to, broadcast (e.g., MBMS), multicast, and unicast. The advantages of the technique may be more pronounced for broadcast scenarios. The content recipient 25 may be a user terminal, such as a mobile phone, PDA, laptop, PC, media player, and the like. The content file manager 20 may be a separate entity, but may also be integrated with the CI 22 and/or the RI 26, or be a part of the distribution infrastructure 23.

The tasks, or functions of the entities shown in FIGS. 1B, 4 and 5 are described in detail below with reference to FIGS. 8 and 9 and a exemplary content service called "Top 100 songs".

Figure 8:
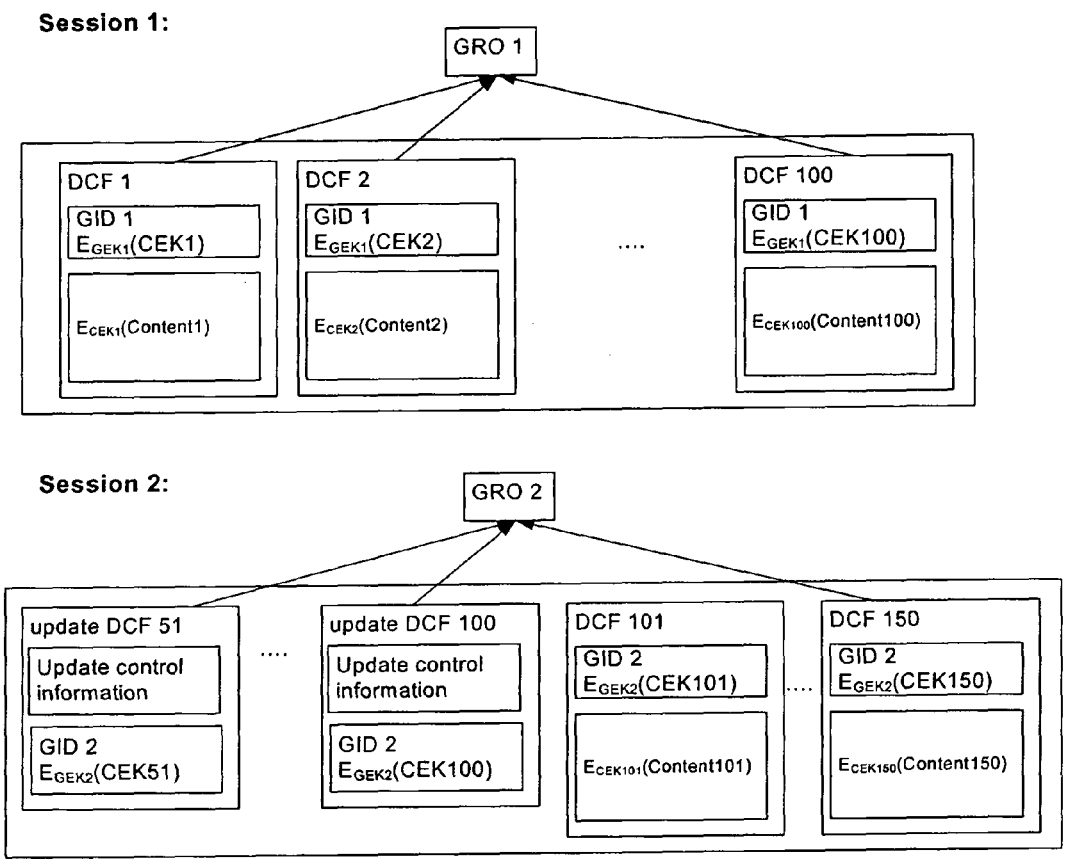
FIG. 8 is a block diagram illustrating an update procedure of content files according to an embodiment of the technique.
Figure 9:
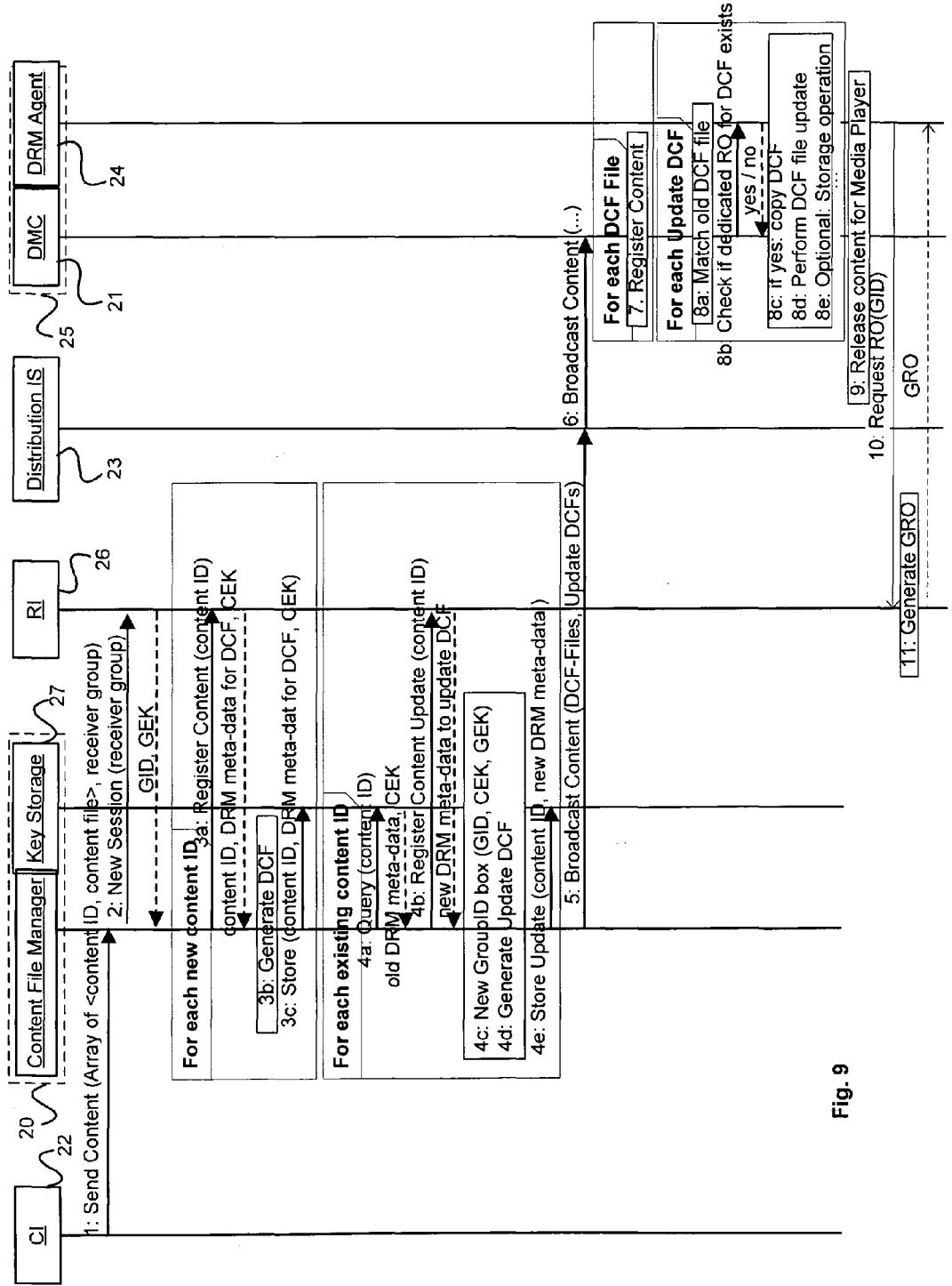
FIG. 9 is a signalling diagram showing an embodiment of an update procedure of content files.

FIG. 8 shows an update procedure of content files according to an embodiment of the technique. The complete procedure is also depicted in FIG. 9 in a signalling diagram. The detailed steps are described below and will be denoted with (step xy).

By way of the content service "Top 100 songs", a subscription to the top 100 songs is distributed as music files to a group of user equipment (such as mobile telephones) e.g. via broadcast. The user equipment shall always have access to the music files of the top 100 songs of the music charts. This list is updated on a regular basis, e.g., every week. In order to avoid unnecessary traffic, only music files for the new titles shall be broadcasted, whereas music files for the titles which were in the charts before shall be made accessible by updating the respective ROs. However, under the conventional DRM system, such as the OMA DRM 2.0 system, this cannot be realized using GROs as the (subset) members in a group cannot be changed. Hence, using OMA DRM 2.0, either a separate RO per music file needs to be used, or all content items must be aggregated into the same group. This first choice would cause a huge amount of signalling traffic to update all ROs for all user equipment, where as the second choice would result in an access not only to the current top 100 songs but to also all songs which have ever been in the top 100.

Using the technique as described herein, the problems or dilemmas experienced in the conventional DRM system can be solved. Firstly, the CI 22 decides which content items (music files) should be distributed to which content recipient 25. Then, the CI 22 passes the content items, the content ID(s) (uniquely identifying the respective content items) and the recipient group information to the content file manager 20 (step 1 in FIG. 9). The recipient group information may comprise access rights for the whole group or per recipient 25.

The content file manager 20 controls the content protection for all sessions. Therefore it communicates with the RI 26 to generate and register the CEKs and the GEKs and also to generate a new GroupID (step 2 in FIG. 9).

In case of a new content ID, the content file manager 20 prepares the content files as follows: After registering the content item at the RI 26 (step 3a), the content file manager 20 generates a new content file using the obtained content data (step 3b). The content file manager 20 stores CEKs and their assignments to the generated new content files in a key storage database and optionally together with DRM related meta data received from the RI 26 (step 3c). In case of a "first time" session, the content file manager 20 sends all the generated new content files via the distribution infrastructure 23 to the recipients 25.

Referring to FIGS. 8 and 9 again, in case of a session "update" (i.e. some content items of a previous session are scheduled again), the procedure is as follows: The content file manager 20 controls which content items that were already sent to the recipients 25 require a rights update (e.g., music files for songs that were already last week in a Top 100 service). Before generating the update, the content file manager 20 retrieves the old DRM meta-data and the CEK from the Key Storage 27 (step 4a) and registers the content update at the RI 26 (step 4b). The content file manager 20 generates for those update content files, new boxes which comprises a new GroupID and the newly encrypted CEKs (step 4c). That is, the CEK for each of the update content files is encrypted with the new GEK. Furthermore, the content file manager 20 may generate modification/update control information. This information is intended for the DMC 21 to perform secure content file updates.

The control information may include one or more of:
 an identifier of the content file that needs to be modified at the DMC, e.g. an old DRM content ID or an old content file name pointing to a previously-received content file (e.g. 41) comprising a content item;

an identifier of the content file after the modification by the DMC, e.g. a new DRM content ID pointing to the modified content file (e.g. 58);
a hash value of at least parts of the modified content file (e.g. 58);
a hash value of parts of the update content file (e.g. 41');
other DRM common headers;
modification/update application instructions, e.g., relative positions of boxes to be updated in the previously-received content file (see above).

The content file manager 20 further performs two actions. As a first action, the update GroupID box is signed e.g. by the RI 26 to prove to the recipients 25 the trustable origin of the updates. As a second action, an update timestamp value is included in the update content file. The time stamp can indicate when the update content file is created. This is beneficial in that the content recipient can be signalled which update content file is the most recent update. This is useful especially in case an update message is e.g. delayed or missed. Alternative to the time stamp, a sequence number could be included in the update content file; from the sequence number the content recipient may be able to determine the most recent update.

The content file manager 20 hence generates an update content file ("update DCF"), e.g., an XML data structure, by combining aforementioned information (step 4*d*). This file is distributed together with the completely new content files created by the content file manager 20 via the distribution infrastructure 23 to the recipients 25 (steps 5, 6) (see also FIG. 8, Session 2).

Referring again to FIG. 9, the DCF Management Client (DMC) 21 on the recipient 25 processes the received content files in several steps. In case of a new DCF file, the DMC 21 registers the new DCF file, e.g., by registering the content ID and the storage location thereof (step 7). In case of an updated DCF file, the DMC 21 performs the following:
1. Match update to previously received DCF file (step 8*a*);
2. check with the DRM agent 24 if other (e.g., privately acquired) ROs exist (step 8*b*),
   a. If yes, create copy of the previously-received DCF file in order to avoid breaking the existing ROs (step 8*c*);
3. apply file update (step 8*d*);
   a. modify the stored previously-received DCF file using update control information and new group information;
   b. add/change DMC's registration information for the DCF file;
4. perform storage management (optional) (step 8*e*);
   a. delete old content;
   b. mark for optional deletion (e.g. if memory runs low);
   c. schedule future deletion.

In detail, "apply DCF file updates" in step 3. above means that the DMC 21 will modify the GroupID boxes in those previously-received DCF files and other information transmitted in the updated DCF file, e.g., the content ID. The modification can comprise, for example, replacing the GroupID of a previously-received DCF file with the new group identifier comprised in the respective update content file. As an alternative, the modification can comprise adding to the previously-received content file the new group identifier comprised in the update content file. If a hash value was included in the updated DCF file, the DMC 21 may also verify if the updated DCF file is correct or not. This way those DCF files are updated and they are now bound to the rights of the new GRO.

The modification, or the update, process of the DCF files can be described with more details by the following basic steps:

1. Localization of the "old" DCF file
   This can be realized with help of the "("old") DRM content ID", which was provided within the update control information. The DMC 21 registered the storage location (e.g. in a table) of the "old" DCF file and through the provided old DRM content ID, the DMC 21 is capable of finding the old DCF
2. Identification of the file segments that need to be modified
   The parts of the DCF file that need to be modified are boxes or fields of the DCF file. A box may have various attributes, and can be identified via the Box-Type. To update an DCF file, it is necessary to identify the DRM container and the GroupID box in this container. In this way the DMC 21 can identify the relevant location of the box(es) that need to be updated.
3. Modification (Replacement/Addition) of the relevant parts
   If the new GroupID is of the same size as the previous one, the box can be replaced immediately within the provided data. However, if the size is different, it is necessary to construct the new file by combining the parts that are not updated from the old DRM content item and embedding the new GroupID box at the respective position. Analogously, the Content ID is updated.
   Alternatively, instead of a replacement, a new GroupID may be added to the DCF file to be modified. For example, a new box comprising the new GroupID from the update DCF file may be added to the DCF file to be modified. The modified DCF file then comprises a list of two (or more) GroupIDs: the GroupID(s) already comprised in the DCF file and the new GroupID from the update content file.
4. Verification of correctness of performed changes via file hash value (may be optional)
   Through the above described changes it may be desired to verify that the update process was performed correctly. This may typically be done through a test of the hash value for the file (e.g. SHA1 or MD5). The integrity of the hash is ensured by an electronic (RSA) signature, e.g., using the public key of the DRM Rights Issuer.

The recipients 25 may request the new GROs, e.g., via the ROAP protocol, from the RI 26 (steps 10, 11), either directly upon receipt of the DCF files or when a user decides to use the content item comprised in the DCF files.

Checking and duplication of DCF files, if further rights objects exist, ensures that all existing ROs will always work and that a content item with a valid license will never be deleted. The further rights object may be another group rights object, but it can also be a "private" rights object, which is a rights object applicable to the consumption of a particular content file only and not to the other content files in the same group. Duplication may be used in order to be compliant with the existing OMA DRM 2.0 standard.

If a recipient 25 joins the content service after the first initial start, the content file manager 20 may provide this recipient via the distribution infrastructure 23, e.g., via a unicast delivery, with the most recent version of all actual complete DCF files. Hence, all later joining recipients 25 will also be able to handle following distributed update DCF files in a correct way. If a large number of recipients 25 are joining at the same time, they could cause unicast resources problems. In this case, the content file manager 20 may also decide to distribute all actual DCF files to the complete group and treating thereby all content items as new ones (i.e. not using any update DCF files).

The technique for content management using group rights as described here above presents numerous advantages. For instance, by effecting partial updates of content files, the technique reduces signalling overhead in content distribution. The reduction may be even more pronounced in content broadcast scenarios. The technique also makes possible an active and flexible management of the group memberships of content files. Further, through the application of assigning new groups and using corresponding new group encryption keys, the protected content stored on the content recipients can be managed in a secure way. In case that the content recipient is a user terminal, such as a mobile terminal running a DRM agent thereon, the application of the technique does not require the DRM agent to be modified. That is, a standard OMA DRM agent may be used. The file update mechanism can be standardized and implemented independently of the DRM core of the agent.

It is pointed out that although the technique has been described with respect to the OMA DCF file format, it works analogously if other formats, e.g., Packetized DCF (PDCF) is used instead. The OMA DRM Content Format has two variants, or "profiles", the Discrete Media Profile and the Continuous Media Profile (also known as Packetized DCF, or PDCF). The Discrete Media Profile is used to package and protect discrete media such as ring tones, applications, images, etc.; it allows the CI to wrap any content in an "envelope", DCF. The content is then encrypted as a single object. The Continuous Media Profile (PDCF) is used to protect continuous media, e.g., audio and video. Continuous Media is protected in a separate profile, because it is packetized and thus the profile is called the Packetized DCF (PDCF).

Furthermore, a DCF/PDCF file may comprise more than one box with OMA DRM information, e.g., for the audio and video part of a movie. Hence, an updated DCF/PDCF file may contain information to update multiple OMA DRM boxes in a single DCF/PDCF file. For a PDCF, the process of verifying correctness of the performed updates is analogous. However, there the correct track may need to be identified instead of the correct DRM container.

The technique also covers the possibility to update content files that are assigned to two or more groups. An assignment of content files to multiple groups may require a change of the OMA DRM standard, since this would mean multiple GroupID boxes per content file.

The cryptographic keys used in the technique may be generated by the RI. Equivalently, they may be generated by the content file manager or by the CI and signalled to the RI or the content file manager and RI, respectively.

Although embodiments of the technique for content management using group rights have been illustrated in the accompanying drawings and described in the foregoing description, it will be understood that the technique is not limited to the embodiments disclosed herein. The technique is capable of numerous re-arrangements, modifications, and substitutions without departing from the scope of the invention.

The invention claimed is:

1. A method of creating content files for content items to be used by one or more content recipients, wherein the content files are to be grouped by means of a group identifier associated with a group rights object, the method performed by a computer processor of a content file manager and comprising:
    assigning, to a new group, a plurality of content items that are to be distributed to the one or more content recipients, wherein a group identifier of the new group is associated with a new group rights object;
    determining by the computer processor if any of the content items of the new group have been previously distributed to the one or more content recipients;
    for each previously-distributed content item, creating by the computer processor an update content file including the group identifier of the new group and excluding the previously-distributed content item itself; and
    outputting at least each update content file.

2. The method of claim 1, further comprising, for each content item that has not been previously distributed:
    creating a new content file including that content item and the group identifier of the new group; and
    outputting the new content file.

3. The method of claim 1, further comprising, for each previously-distributed content item:
    generating control information instructing the one or more content recipients to modify the corresponding content file previously distributed to those one or more content recipients; and
    associating the control information with the respective update content file.

4. The method of claim 3, wherein the control information for each update content file comprises one or more of an identifier of the update content file, an identifier of a previously distributed content file created for the respective previously-distributed content item, a hash value for verifying the content file update, Digital Rights Management header information, and one or more modification instructions.

5. The method of claim 1, further comprising at least one of:
    for each content item that has not been previously distributed, providing a content encryption key (CEK) for protecting that content item and storing the CEK in a data storage; and
    for each previously-distributed content item, retrieving the respective CEK from the data storage and including the CEK in the respective update content file.

6. The method of claim 1, further comprising:
    digitally signing at least part of each update content file.

7. A method implemented by a computer processor of a content recipient for processing content files created for content items, wherein the content files are grouped by means of a group identifier associated with a group rights object, the method comprising:
    receiving at least one content file at the computer processor;
    determining by the computer processor if the content file is an update content file created for a content item provided to the content recipient via a previously-received content file, wherein the update content file comprises a group identifier of a new group associated with a new group rights object and excludes the content item previously provided; and
    if the content file is determined to be an update content file, modifying by the computer processor the previously-received content file for continued use by the content recipient.

8. The method of claim 7, wherein modifying the previously-received content file comprises replacing its group identifier with the new group identifier comprised in the update content file or adding to the previously-received content file the new group identifier comprised in the update content file.

9. The method of claim 7, wherein the update content file further comprises control information regarding the modification of the previously-received content file, and the method further comprises modifying the previously-received content file based on the control information.

10. The method of claim 9, wherein the control information in the update content file comprises one or more of an identifier of the update content file, an identifier of the respective previously-received content file, a hash value for verifying the content file update, Digital Rights Management header information, and one or more modification instructions.

11. The method of claim 7, further comprising:
checking if the content recipient has previously acquired any further rights object for the previously-received content file; and
creating a copy of the previously-received content file if it is determined that the content recipient has previously acquired one or more further rights object for the previously-received content file.

12. The method of claim 7, further comprising either:
deleting the previously-received content file;
marking the previously-received content file for an optional deletion; or
scheduling a future deletion of the previously-received content file.

13. The method of claim 7, further comprising at least one of:
registering the received at least one content file with a rights issuer if it is not an update content file; and
updating the registration of the corresponding previously-received content file if the received content file is an update content file.

14. The method of claim 13, wherein said registering comprises registering an identifier of the content item included in the received at least one content file and a storage location of the received at least one content file.

15. The method of claim 7, further comprising obtaining the new group rights object according to the group identifier of the new group.

16. A content file manager configured to create content files for content items to be used by one or more content recipients, wherein the content files are to be grouped by means of a group identifier associated with a group rights object, the content file manager comprising:
a computer processor configured to implement a first component, a second component, and a content file creator;
the first component configured to assign, to a new group, a plurality of content items that are to be distributed to the one or more content recipients, wherein a group identifier of the new group is associated with a new group rights object;
the second component configured to determine if any of the content items of the new group have been previously distributed to the one or more content recipients;
the content file creator configured to, for each previously-distributed content item, create an update content file including the group identifier of the new group and excluding the previously-distributed content item itself; and
an output configured to output at least each update content file.

17. The content file manager of claim 16, wherein the content file creator is further configured to, for each content item that has not been previously distributed, create a new content file including that content item and the group identifier of the new group, and wherein the output is further configured to output the new content file.

18. The content file manager of claim 16, wherein the content file manager is further configured to, for each previously-distributed content item, generate control information for instructing the one or more content recipients to modify the corresponding content file previously distributed to those one or more content recipients and associate the control information with the respective update content file.

19. The content file manager of claim 18, wherein the control information for each update content file comprises one or more of an identifier of the update content file, an identifier of a previously distributed content file created for the respective previously-distributed content item, a hash value for verifying the content file update, Digital Rights Management header information, and one or more modification instructions.

20. A device configured to process content files created for content items, wherein the content files are grouped by means of a group identifier associated with a group rights object, the device comprising:
an input configured to receive at least one content file; and
a computer processor configured to implement a determinator and a modifier;
the determinator configured to determine if the content file is an update content file created for a content item previously provided to the device via a previously-received content file, wherein the update content file comprises a group identifier of a new group associated with a new group rights object and excludes the content item previously provided; and
the modifier configured, if the determinator determines that the content file is an update content file, to modify the previously-received content file for continued use by the device.

21. The device of claim 20, wherein the modifier is further configured to modify the previously-received content file by replacing its group identifier with the new group identifier comprised in the update content file or adding to the previously-received content file the new group identifier comprised in the update content file.

22. The device of claim 20, wherein the update content file further comprises control information regarding the modification of the previously-received content file, and the modifier is further adapted to modify the previously-received content file based on the control information.

23. The device of claim 22, wherein the control information in the update content file comprises one or more of an identifier of the update content file, an identifier of the respective previously-received content file, a hash value for verifying the content file update, Digital Rights Management header information, and one or more modification instructions.

* * * * *